Aug. 21, 1962  E. J. WESLEY  3,050,625
RECYCLING RADIATION RATE METER
Filed May 3, 1960
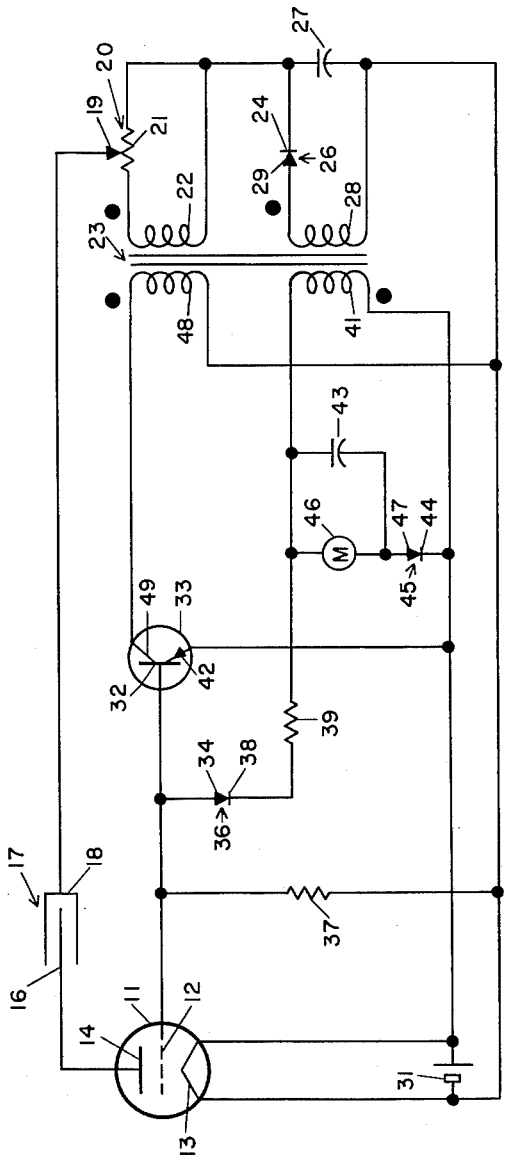
INVENTOR.
EDWARD J. WESLEY
BY
ATTORNEYS

United States Patent Office

3,050,625
Patented Aug. 21, 1962

3,050,625
RECYCLING RADIATION RATE METER
Edward J. Wesley, 2501 Ensenada Way, San Mateo, Calif.
Filed May 3, 1960, Ser. No. 26,659
4 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

This invention relates to recycling rate meter and more particularly to a recycling rate meter utilizing a minimum of parts and power requirements for complete portable operation.

In the prior art, various circuits have been employed to effect a lightweight portable rate meter, but all have possessed certain undesirable inherent features. The most prominent undesirable feature of the prior art has been the utilization of detection circuits which require a high voltage source or large current supply. In conjunction with this, the prior art devices have generally utilized large complicated circuits which require excessive space and weight.

It is thus an object of the present invention to provide a recycling radiation rate meter which is completely portable in size and weight.

Another object is the provision of a portable recycling radiation rate meter with a minimum of power requirements.

Still another object is the provision of a recycling radiation rate meter which maintains its accuracy throughout the aging of the supply battery.

A further object is to provide a recycling radiation rate meter which is accurate over a wide range of radiation intensity.

According to the invention, a simple hybrid electrometer tube-transistor detector and trigger circuit is utilized as disclosed in my co-pending application Serial No. 780,173 now U.S. Patent No. 3,019,339. Since only the intensity or dose rate is being metered, a much simpler and more portable circuit arrangement is utilized. The entire circuitry can have for its primary power a single flash light cell which reduces the weight and space considerably, along with a single transformer operation for the same purposes. A unique metering arrangement measures the degenerative feedback present in the single swing blocking oscillator action and ensures linear accuracy over a wide range. The temperature effect on the transistor employed, along with the aging of the battery, is largely alleviated by use of a saturable core transformer in the blocking oscillator circuit. Another economy in space and weight is the utilization of the blocking oscillator pulse as the primary supply to the high voltage rectifier used in conjunction with the radiation chamber and electrometer tube. It is thus seen that the main disadvantages of the prior art devices have been overcome in that the power requirements, weight, and space have been greatly reduced.

These and other advantages will become more readily apparent in reference to the detailed description taken in conjunction with the drawing, wherein, the sole FIGURE represents a schematic diagram of a preferred embodiment of the present invention.

Referring now to the drawing, there is shown electrometer tube 11 having a control grid 12, filament 13, and plate 14. Plate 14 is connected to the inner electrode 16 of radiation chamber 17. Outer cylinder 18 of radiation chamber 17 is connected to sliding contact 19 which along with resistor 21 comprises potentiometer 20. Resistor 21 is connected across winding 22 of transformer 23. One end of winding 22 is connected to cathode 24 of diode 26 and one plate of capacitor 27, the other plate of which is connected through winding 28 to the other side of anode 29 of diode 26. The junction of capacitor 27 and winding 28 is connected to the negative side of battery 31 and one side of filament 13. The other side of filament 13 is connected to the positive side of battery 31. Grid 12 is connected to base 32 of transistor 33, anode 34 of diode 36, and through resistor 37 to the negative side of battery 31. Cathode 38 of diode 36 is connected through resistor 39 and winding 41 of transformer 23 to the positive side of battery 31. Emitter 42 of transistor 33 is also connected to the positive side of battery 31. Capacitor 43 and diode 45 are connected serially across winding 41. Anode 47 of diode 45 is connected to the positive side of battery 31 and cathode 44 of diode 45 is connected to capacitor 43. Meter 46 is connected across capacitor 43. Collector 49 of transistor 33 is connected through winding 48 of transformer 23 to the negative side of battery 31.

*Circuit Operation*

The ion chamber or detector 17 can be described as a set of coaxial cylinders shown schematically at 16 and 18, insulated from each other with the intervening area filled with gas. The detector capacitance described below is the capacitance of these two cylinders, one to the other. A high D.C. voltage between these two electrodes, will cause no current to flow unless the gas medium is made conducting. The gas, which is ordinarily a very good insulator, is made conducting by gamma rays which ionize the gas molecules. Thus, the current flowing across the ion chamber is a direct result of the gamma ray flux ionizing the gas medium.

Grid 12 of tube 11 is operated with a small positive potential with respect to the average voltage of filament 13. Grid 12 is the signal output terminal of tube 11 in this circuit. Plate 14 is the input terminal and is normally operated negative with respect to the average filament voltage. A negative potential on plate 14 inhibits the flow of current to grid 12 and will cut off the flow of current to grid 12 at a negative plate potential greater than a predetermined fixed value hereinafter called V cutoff.

In the operation of the circuit this plate voltage is driven negative beyond the V cutoff voltage. The plate voltage is then diminished by the current flowing through ion chamber 17. As the plate voltage decreases to V cutoff and then to a slightly smaller value, grid current starts to flow and increases a few microamps.

At this point, with grid 12 conducting slightly, there is a complete positive feed back loop consisting of the plate to grid transconductance of tube 11, transistor 33, transformer windings 48 and 22, the operatively tapped-off portion of resistor 21, sliding contact 19, and the capacitance of chamber 17 back to plate 14 of tube 11. As the D.C. voltage on plate 14 diminishes, the tube transconductance increases and the system becomes unstable. It proceeds to oscillate one cycle as a blocking oscillator with the signal taken from contact 19 of potentiometer 20 driving outer chamber 18 positive with respect to the filament 13. Chamber electrode 16 connected to plate 14 follows the positive going potential of electrode 18 until the plate 14 tries to go positive. At this time, tube 11 conducts electrons from filament 13 to plate 14 and clamps plate 14 at that point. The current flowing through tube 11 charges the capacitance between the electrodes 16 and 18 of chamber 17.

All this takes place in one positive going cycle which stays on for a fixed period of about 200 micro-seconds. This pulse is terminated by magnetic saturation of the core of transformer 23 and current saturation of transistor collector 49. This voltage spike collapses and the current which was conducted to plate 14 of tube 11 is stored in the chamber capacitance. The plate current has ceased to exist when this positive spike starts to collapse. The stored charge appears as a negative voltage on plate 14 of tube 11 which cuts off the current to grid 12. The recharging cycle is then complete and the circuit must wait until the chamber current discharges the chamber capacitance and the plate voltage falls below V cutoff.

There also exists a positive feedback loop consisting of transistor 33, transformer windings 48 and 41, diode 36 and resistor 39. The operation would be unstable and make the circuit a continuously running blocking oscillator except for the forward potential drop of diode 36. Until the voltage across diode 36 is approximately 0.5 volt, diode 36 is an open circuit and the system will not fire. When a signal is initiated in transformer 23 by the first loop, which includes tube 11 and chamber 17, the voltage spikes in winding 41 overcome the diode 36 voltage and this second circuit takes almost complete control of the system. This is a very low impedance circuit and drives transistor 33 and consequently the transformer 23 very hard, insuring three things:

(1) That the voltage spike charging chamber 17 has sufficient power to fully charge the chamber capacitance.

(2) That the high voltage supply, consisting of winding 28, diode 26 and filter capacitor 27, is driven hard and capacitor 27 fully recharged each cycle. This circuit will be discussed more fully below.

(3) That transformer 23 is driven to magnetic saturation each cycle. When driven to magnetic saturation, the energy stored in magnetic flux in each pulse is constant and the energy delivereed on fly-back to the metering circuit is constant.

In this "power drive" circuit resistor 39 establishes the degree of over-drive of transistor 33 and transformer 23. This over-drive into saturation has a limited effect on the temperature dependence of transformer 23. By varying resistor 39, the temperature dependence of transformer 23 can be made to cancel the dependence of transistor 33. (They have opposite temperature coefficients.)

The power supply circuit consisting of transformer winding 28, diode 26 and capacitor 27 furnishes the high voltage (120–150 volts) for polarization of ion chamber 17. During the positive chamber charging pulse, the pulse of voltage across winding 28 replenishes any charge which may have leaked off capacitor 27 because of leakage or chamber conductance. Capacitor 27 is very large compared to the chamber capacitance, and the voltage swings of the high voltage are very small when the units is measuring a gamma field.

The metering circuit consisting of meter 46, capacitor 43, diode 45 and transformer winding 41 will now be discussed. The polarity of diode 45 operates to inhibit any flow of current in this circuit during the positive chamber charging pulse. However, on the flyback of the transformer (collapse of magnetic field in core to the zero external magnetomotive force state) the energy stored in the transformer core will appear as a voltage pulse with the proper polarity to drive a large current pulse through diode 45 and on to the meter filter capacitor 43. This current pulse is filtered by capacitor 43 and appears as nearly direct current in meter 46.

At this point only three components in the system have not been discussed in detail; transistor 33, resistor 37 and battery 31. Transistor 33 is operated as a conventional power gain element. Resistor 37 is required to adjust the operating point of transistor 33. The battery 31 is shown as a single cell although this certainly has no intrinsic value and could be two or more if necsesary, the important point being that only one voltage source is required.

It is further pointed out that since a constant meter current is required for a constant irradiating field under changing conditions of battery and temperature, the repetition rate in this circuit will vary to maintain the meter current constant.

A setting of contact 19 can be established which will permit the changes in spike voltage and trigger voltage with battery aging to balance each other out. Actually, the adjustment is to make the spike voltage change faster than the trigger voltage (firing point for recharging the circuit) and thus increase the repetition rate with decreasing battery voltage, because the power in each pulse has also fallen with the aging of battery 31.

Obviously many modifications and variations of the present invention are possible in the light of the above teachings. It is therefore to be understood that within the scope of the appended claims the invention may be practiced otherwise than as specifically described.

What is claimed is:

1. A recycling radiation rate meter for measuring radiation intensity comprising a blocking oscillator triggering means, including a radiation detecting means, for producing pulses whose rate is a direct linear function of the degree of radiation sensed by said radiation detecting means; power circuit means, whose input is connected to the output of said blocking oscillator triggering means, for producing pulses in sympathy with the pulses originated by said blocking oscillator triggering means and amplified with respect thereto; rectifier means coupled to said power circuit means for supplying an operating voltage to said radiation detecting means; and metering means, whose input is connected to the output of said power circuit means, for measuring the recycling rate of said amplified pulses from said power circuit means, said recycling rate being reflective of the degree of radiation sensed by said radiation detecting means.

2. The recycling radiation rate meter of claim 1 wherein said blocking oscillator triggering means has a vacuum tube and a transistor as its active elements.

3. The recycling radiation rate meter of claim 1 wherein said power circuit means includes a saturable transformer for quenching said power circuit means output pulses.

4. The recycling radiation rate meter of claim 1 wherein said blocking oscillator triggering means and said power circuit means include a common transistor as an active element and a common saturable transformer.

References Cited in the file of this patent
UNITED STATES PATENTS

| | | |
|---|---|---|
| 2,617,043 | Hepp | Nov. 4, 1952 |
| 2,833,932 | Constable et al. | May 6, 1958 |
| 2,838,680 | Bender et al. | June 10, 1958 |
| 2,956,168 | Pinckaers | Oct. 14, 1960 |